United States Patent
Kallali Narayana et al.

(10) Patent No.: US 10,212,516 B1
(45) Date of Patent: Feb. 19, 2019

(54) SYSTEMS AND METHODS FOR ACTIVATING AUDIO PLAYBACK

(71) Applicant: Honeywell International Inc., Morristown, NJ (US)

(72) Inventors: Bharath Kallali Narayana, Sringeri (IN); Bharat Balaso Khot, Bangalore (IN); Giridhara Kalkere, Bangalore (IN); Karthikeyan Pollachi Duraiswamy, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/848,942

(22) Filed: Dec. 20, 2017

(51) Int. Cl.
  *H04R 3/12* (2006.01)
  *H04W 8/00* (2009.01)
  *H04W 40/24* (2009.01)

(52) U.S. Cl.
  CPC ............ *H04R 3/12* (2013.01); *H04W 8/005* (2013.01); *H04R 2420/07* (2013.01); *H04W 40/246* (2013.01)

(58) Field of Classification Search
  CPC ............... H04R 2227/005; H04R 3/12; H04R 2420/07; H04R 29/001
  See application file for complete search history.

(56) References Cited

U.S. PATENT DOCUMENTS

| 9,277,343 B1 | 3/2016 | Alexandrov |
| 9,584,948 B2 | 2/2017 | Yeo et al. |
| 2014/0328505 A1 | 11/2014 | Heinemann et al. |
| 2016/0119759 A1 | 4/2016 | Azih |
| 2016/0373909 A1* | 12/2016 | Rasmussen ............. H04W 4/80 |

FOREIGN PATENT DOCUMENTS

CN 105652704 A 6/2016

OTHER PUBLICATIONS

English language translation of Bibliographic data and Abstract of CN105652704 (A).
English language translation of Abstract, Claims, and Description of CN105652704A, https://patents.google.com/patent/CN105652704A/en.

* cited by examiner

*Primary Examiner* — Keith Ferguson
(74) *Attorney, Agent, or Firm* — Husch Blackwell LLP

(57) ABSTRACT

Systems and methods for activating audio playback are provided. Some systems and methods may include a portable user device moving throughout a region and determining a current location of the portable user device within the region and a control panel activating an audio playback mode for a varying group of a plurality of speakers based on the current location of the portable user device within the region.

20 Claims, 1 Drawing Sheet

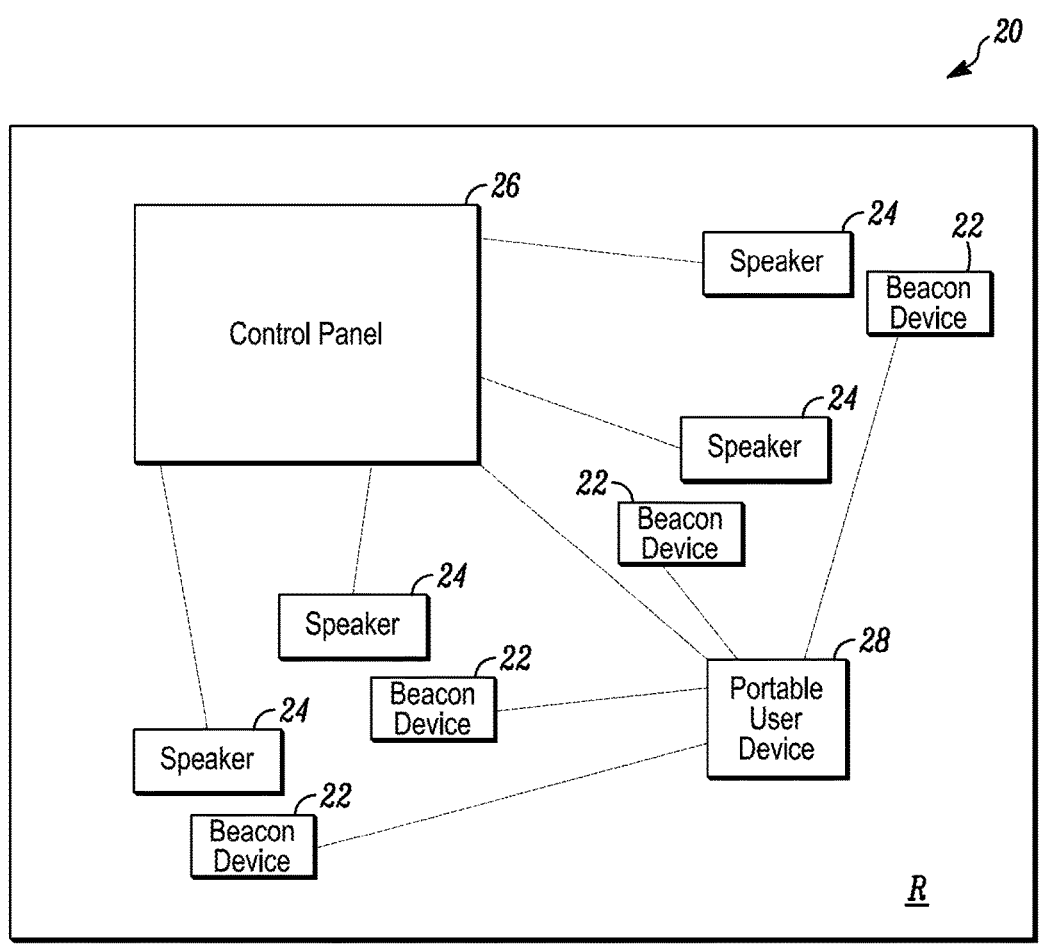

SYSTEMS AND METHODS FOR ACTIVATING AUDIO PLAYBACK

FIELD

The present invention relates generally to audio playback systems and methods. More particularly, the present invention relates to systems and methods for automatically activating and deactivating audio playback modes at specific speakers deployed in a region based on a location of a portable user device within the region.

BACKGROUND

Known systems and methods for audio playback at multiple speakers require a user to preselect a grouping of speakers to play the desired audio. Such systems and methods rely on manually adjusting the speakers to conform to a location of a user or a new user preference.

In view of the above, there is a continuing, ongoing need for improved systems and methods.

BRIEF DESCRIPTION OF THE DRAWINGS

FIG. 1 is a block diagram of an audio playback system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for activating audio playback. For example, systems and methods disclosed herein may include a portable user device determining a location of the portable user device within a region and a control panel activating an audio playback mode for a first group of a plurality of speakers based on the location of the portable user device.

Systems and methods disclosed herein are described as part of a home automation system, security system, or multi-room audio system. It is to be understood that such systems may include, but are not limited to systems that include a control panel in communication with the plurality of speakers and the portable user device (e.g. mobile phone, tablet, smart phone, mp3 player, etc.).

In accordance with disclosed embodiments, the portable user device can freely move within the region and encounter a first broadcast signal from a first one of a plurality of beacon devices deployed in the region. In some embodiments, the plurality of beacon devices can include wireless Bluetooth devices. The portable user device may use the first broadcast signal to determine a current or first location of the portable user device, and the portable user device may transmit a first location signal indicative of the first location to the control panel. Additionally or alternatively, in some embodiments, the portable user device may forward the first broadcast signal to the control panel, and the control panel may use the first broadcast signal to identify the first location of the portable user device. The control panel may use the first location of the portable user device identified in the first location signal or identified by the control panel to identify the first group of the plurality of speakers deployed in the region, and each of the first group of the plurality of speakers may be switched into the audio playback mode, which can allow audio sent from the control panel to be broadcast from each of the first group of the plurality of speakers. The control panel may activate the audio playback mode for the first group of the plurality of speakers and deactivate or refrain from activating the audio playback mode for those speakers outside of the first group of the plurality of speakers. No audio may be broadcast from a speaker while the audio playback mode is deactivated.

In some embodiments, activating the audio playback mode may include actuating physical or digital switches to couple the control panel to the first group of the plurality of speakers. The switches may be a part of each of the plurality of speakers or the control panel. In some embodiments, the audio playback can be routed through the control panel, and activating the audio playback mode for the first group of the plurality of speakers can include the control panel selectively sending the audio to only the first group of the plurality of speakers. For example, the control panel may maintain a live list of ports or address for the first group of the plurality of speakers identified to receive the audio and forward the audio to only the ports or addresses identified in the live list. In some embodiments, each of the plurality of speakers may be connected to the control panel by a respective wireless connection, such as 802.11 Wi-Fi or Bluetooth.

In some embodiments, the portable user device may move to an updated or second location and receive a second broadcast signal from a second one of the plurality of beacon devices. The portable user device may use the second broadcast signal to determine the second location of the portable user device within the region, and the portable user device may transmit a second location signal indicative of the second location of the portable user device to the control panel. The control panel may use the second location of the portable user device identified in the second location signal to identify a second group of the plurality of speakers that are proximate to the second location of the portable user device, and the control panel may activate the audio playback mode for the second group of the plurality of speakers and deactivate or refrain from activating the audio playback mode for any speaker outside of the second group of the plurality of speakers.

In some embodiments, the portable user device may determine the location of the portable user device by identifying a respective one of the plurality of beacon devices that sent a broadcast signal received at the portable user device. The portable user device may then recall a preassigned location of the respective one of the plurality of beacon devices and determine a distance and a direction of the portable user device relative to the preassigned location of the respective one of the plurality of beacon devices. Determining the distance and the direction of the portable user device relative to the preassigned location of the respective one of the plurality of beacon devices can facilitate the portable user device determining a precise location of the portable user device, that is, updating the current location of the portable user device, and may result in the control panel identifying a subset of a group of the plurality of speakers to activate even while the portable user device continues to receive the broadcast signal from the single, respective one of the plurality of beacon devices. In some embodiments, the portable user device can include a dedicated software application for determining the location of the portable user device, and in some embodiments, functions of the control panel described herein may be performed by the portable user device itself.

In some embodiments, the first group of the plurality of speakers may include a single speaker. In these embodiments, the single speaker may be closest to the first location of the portable user device in the region as compared to other locations of the plurality of speakers. Furthermore, in some embodiments, each of the plurality of speakers may be associated with a respective one of the plurality of beacon devices. In these embodiments, the location signal that the portable user device transmits to the control panel may include information identifying the respective one of the plurality of beacon devices that sent the broadcast signal received by the portable user device. The control panel may then identify the first group of the plurality of speakers or the single speaker by matching the respective one of the plurality of beacon devices with one or more associated ones of the plurality of speakers. Further still, in some embodiments, the control panel may identify the first group of the plurality of speakers as being within a predetermined distance of the first location of the portable user device.

In some embodiments, some of the plurality of speakers may be linked such that when the control panel identifies a first of linked speakers to be activated into the audio playback mode, any speakers linked to the first of the linked speakers will also be activated into the audio playback mode. In some embodiments, the control panel may include a list documenting links between each of the plurality of speakers in a memory of the control panel. In some embodiments, the plurality of speakers linked together may correspond to all of the plurality of speakers deployed in a sub-region of the region, and the sub-region may include a room in the region or a grouping of the plurality of speakers concentrated in a section of the room, such as kitchen speakers in an open concept floor plan.

In some embodiments, the control panel can identify the first group of the plurality of speakers by identifying each of the of the plurality of speakers having a respective location within the region that is within a predetermined distance of the first location of the portable user device. In some embodiments, the respective location of each of the plurality of speakers may be stored or mapped in the memory of the control panel. In some embodiments, the control panel can record the respective location of each of the plurality of speakers when each of the plurality of speakers first connects to the control panel.

In some embodiments, each of the plurality of beacon devices may initially connect to the control panel, and responsive thereto, the control panel may assign each of the plurality of beacon devices a respective broadcast signal and associate the respective broadcast signal of a respective one of the plurality of beacon devices with a respective location of the respective one of the plurality of beacon devices. In some embodiments, the respective broadcast signal for the respective one of the plurality of beacon devices can be preconfigured within the respective one of the plurality of beacon devices, and the control panel can create a record of the respective broadcast signal for each of the plurality of beacon devices when each of the plurality of beacons is initially connected to the control panel. In some embodiments, the control panel may store an indication of an association between the respective broadcast signal and the respective location of each of the plurality of beacon devices in a list in the memory of the control panel.

FIG. 1 is a block diagram of an audio playback system 20 in accordance with disclosed embodiments. As shown in FIG. 1, the system 20 may include a plurality of beacon devices 22 deployed throughout a region R, a plurality of speakers 24 deployed throughout the region R, a control panel 26 connected to at least the plurality of speakers 24, and a portable user device 28 capable of receiving signals from the plurality of beacon devices 22 and communicating with the control panel 26.

In accordance with disclosed embodiments, the portable user device 28 may move freely throughout the region R and intermittently receive broadcast signals from some of the plurality of beacon devices 22. The portable user device 28 may determine a current location of the portable user device 28 based on data derived from received broadcast signals, and the portable user device 28 may transmit a location signal indicative of the current location to the control panel 26, which, in turn, may activate a group of the plurality of speakers 24 proximate to the current location of the portable user device 28. As the portable user device 28 continues to move freely throughout the region R, the portable user device 28 can receive different broadcast signals from different ones of the plurality of beacon devices 22 and can update the current location of the portable user device 28 based on the received broadcast signals. Then, the control panel 26 can update the group of plurality of speakers 24 to be activated based on the location signal indicative of the current location of the portable user device 26.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:
1. A method comprising:
a portable user device receiving a first broadcast signal from a first one of a plurality of beacon devices deployed in a region;
the portable user device determining a first location of the portable user device based on the first broadcast signal;
the portable user device transmitting a first location signal indicative of the first location of the portable user device to a control panel;
the control panel identifying a first group of a plurality of speakers deployed in the region based on the first location of the portable user device, each of the plurality of speakers including an audio playback mode that allows transmission of audio therefrom, the first group of the plurality of speakers being proximate to the first location of the portable user device; and
the control panel activating the audio playback mode for the first group of the plurality of speakers and deactivating or refraining from activating the audio playback mode for any of the plurality of speakers outside of the first group of the plurality of speakers.
2. The method of claim 1 further comprising:
the portable user device moving to a second location different than the first location;
the portable user device receiving a second broadcast signal from a second one of the plurality of beacon devices;

the portable user device determining the second location of the portable user device based on the respective second broadcast signal;

the portable user device transmitting a second location signal indicative of the second location to the control panel;

the control panel identifying a second group of the plurality of speakers based on the second location of the portable user device, the second group of the plurality of speakers being proximate to the second location of the portable user device; and the control panel activating the audio playback mode for the second group of a plurality of speakers and deactivating or refraining from activating the audio playback mode for any of the plurality of speakers outside of the second group of the plurality of speakers.

3. The method of claim 1 wherein the first group of the plurality of speakers includes a single speaker located within the region, and wherein a second location of the single speaker is closest to the first location of the portable user device as compared to other locations of the plurality of speakers.

4. The method of claim 3 wherein each of the plurality of speakers is associated with a respective one of the plurality of beacon devices, wherein the first location signal indicative of the first location of the portable user device includes information identifying the first one of the plurality of beacon devices, and wherein the control panel identifies the single speaker by matching the first one of the plurality of beacon devices to the respective one of the plurality of beacon devices associated with the single speaker.

5. The method of claim 1 wherein the plurality of beacon devices include Bluetooth devices.

6. The method of claim 1 wherein the plurality of speakers are wirelessly connected to the control panel.

7. The method of claim 1 further comprising recording, in a memory of the control panel, a respective location of each of the plurality of speakers within the region.

8. The method of claim 7 wherein the control panel identifying the first group of the plurality of speakers includes the control panel identifying each of the plurality of speakers having the respective location within a predetermined distance of the first location of the portable user device.

9. The method of claim 1 wherein the portable user device includes a dedicated software application for determining the first location of the portable user device.

10. The method of claim 1 wherein the portable user device determines the first location of the portable user device by identifying the first one of the plurality of beacon devices from the first broadcast signal, recalling a preassigned location of the first one of the plurality of beacon devices, and determining a distance and a direction of the portable user device relative to the preassigned location of the first one of the plurality of beacon devices.

11. A system comprising:
a plurality of beacon devices deployed in a region;
a plurality of speakers deployed in the region, wherein each of the plurality of speakers includes an audio playback mode that allows transmission of audio therefrom;
a control panel; and
a portable user device;
wherein the portable user device receives a first broadcast signal from a first one of a plurality of beacon devices, determines a first location of the portable user device based on the first broadcast signal of the first one of the plurality of beacon devices, and transmits a first location signal indicative of the first location of the portable user device to the control panel, wherein the control panel identifies a first group of the plurality of speakers based on the first location of the portable user device, wherein the first group of the plurality of speakers is proximate to the first location of the portable user device, and wherein the control panel activates the audio playback mode for the first group of the plurality of speakers and deactivates or refrains from activating the audio playback mode for any of the plurality of speakers outside of the first group of the plurality of speakers.

12. The system of claim 11 wherein the portable user device moves to a second location different than the first location, receives a second broadcast signal from a second one of the plurality of beacon devices, determines the second location of the portable user device based on the second broadcast signal of the second one of the plurality of beacon devices, and transmits a second location signal indicative of the second location to the control panel, wherein the control panel identifies a second group of the plurality of speakers based on the second location of the portable user device, wherein the second group of the plurality of speakers are proximate to the second location of the portable user device, and wherein the control panel activates the audio playback mode for the second group of the plurality of speakers and deactivates or refrains from activating the audio playback mode for any of the plurality of speakers outside of the second group of the plurality of speakers.

13. The system of claim 11 wherein the first group of the plurality of speakers includes a single speaker located within the region, and wherein a second location of the single speaker is closest to the first location of the portable user device as compared to other locations of the plurality of speakers.

14. The system of claim 13 wherein each of the plurality of speakers is associated with a respective one of the plurality of beacon devices, wherein the first location signal indicative of the first location of the portable user device includes information identifying the first one of the plurality of beacon devices, and wherein the control panel identifies the single speaker by matching the first one of the plurality of beacon devices to the respective one of the plurality of beacon devices associated with the single speaker.

15. The system of claim 11 wherein the plurality of beacon devices include Bluetooth devices.

16. The system of claim 11 wherein the plurality of speakers are wirelessly connected to the control panel.

17. The system of claim 11 wherein a respective location of each of the plurality of speakers within the region is recorded in a memory of the control panel.

18. The system of claim 17 wherein the control panel identifies the first group of the plurality of speakers by identifying each of the plurality of speakers having the respective location within a predetermined distance of the first location of the portable user device.

19. The system of claim 11 wherein the portable user device includes a dedicated software application for determining the first location of the portable user device.

20. The system of claim 11 wherein the portable user device determines the first location of the portable user device by identifying the first one of the plurality of beacon devices from the first broadcast signal, recalling a preassigned location of the first one of the plurality of beacon devices, and determining a distance and a direction of the portable user device relative to the preassigned location of the first one of the plurality of beacon devices.

\* \* \* \* \*